United States Patent
German et al.

(10) Patent No.: US 11,185,865 B2
(45) Date of Patent: Nov. 30, 2021

(54) MECHANISM FOR STORAGE OF REFRIGERATED CALIBRATION AND QUALITY CONTROL MATERIAL

(71) Applicant: Siemens Healthcare Diagnostics Inc., Tarrytown, NY (US)

(72) Inventors: Ryan German, Riverdale, NJ (US); Colin Mellars, Tucson, AZ (US)

(73) Assignee: Siemens Healthcare Diagnostics Inc., Tarrytown, NY (US)

( * ) Notice: Subject to any disclaimer, the term of this patent is extended or adjusted under 35 U.S.C. 154(b) by 462 days.

(21) Appl. No.: 16/319,294

(22) PCT Filed: Jul. 19, 2017

(86) PCT No.: PCT/US2017/042939
§ 371 (c)(1),
(2) Date: Jan. 18, 2019

(87) PCT Pub. No.: WO2018/017768
PCT Pub. Date: Jan. 25, 2018

(65) Prior Publication Data
US 2019/0283029 A1    Sep. 19, 2019

Related U.S. Application Data

(60) Provisional application No. 62/365,304, filed on Jul. 21, 2016.

(51) Int. Cl.
*B01L 7/00*     (2006.01)
*B01L 9/06*     (2006.01)
(Continued)

(52) U.S. Cl.
CPC ............... *B01L 7/00* (2013.01); *B01L 9/06* (2013.01); *F25B 21/02* (2013.01); *F25B 21/04* (2013.01);
(Continued)

(58) Field of Classification Search
CPC ...... B01L 7/00; B01L 9/06; B01L 2300/1894; F25D 11/02; F25D 23/021; F25D 25/00;
(Continued)

(56) References Cited

U.S. PATENT DOCUMENTS 3,977,794 A    8/1976  Liedholz
4,474,015 A   10/1984  Christmas et al.
(Continued)

FOREIGN PATENT DOCUMENTS

CN    101128263 A    2/2008
CN    101221101 A    7/2008
(Continued)

OTHER PUBLICATIONS

PCT International Search Report and Written Opinion dated Oct. 2, 2017 (10 Pages).
(Continued)

*Primary Examiner* — Emmanuel E Duke

(57) ABSTRACT

Systems and methods for refrigerated storage of controls and calibrators utilize a refrigerant storage assembly having an insulated housing and door assembly, thermoelectric coolers, and the refrigerated base assembly having a metal plate thermally coupled to coolers, one or more sensors, and a plurality of receptacles to receive fluid tubes. Refrigerated storage provides a refrigerated environment suitable for multi-day storage of control and calibrator fluids.

21 Claims, 11 Drawing Sheets

(51) Int. Cl.

| | |
|---|---|
| *F25B 21/04* | (2006.01) |
| *F25D 23/02* | (2006.01) |
| *F25D 25/00* | (2006.01) |
| *G01N 1/42* | (2006.01) |
| *G01N 35/00* | (2006.01) |
| *G01N 35/04* | (2006.01) |
| *F25B 21/02* | (2006.01) |
| *F25D 11/02* | (2006.01) |

(52) U.S. Cl.
CPC ............ *F25D 11/02* (2013.01); *F25D 23/021* (2013.01); *F25D 25/00* (2013.01); *G01N 1/42* (2013.01); *G01N 35/0099* (2013.01); *G01N 35/00693* (2013.01); *G01N 35/04* (2013.01); *B01L 2300/1894* (2013.01); *F25B 2321/0211* (2013.01); *F25B 2321/0251* (2013.01); *F25D 2700/02* (2013.01); *G01N 2035/00445* (2013.01); *G01N 2035/041* (2013.01)

(58) Field of Classification Search
CPC ............... F25D 2700/02; G01N 1/42; G01N 35/00693; G01N 35/0099; G01N 35/04; G01N 2035/00445; G01N 2035/041; F25B 1/02; F25B 1/04; F25B 2321/0211; F25B 2321/0251
See application file for complete search history.

(56) References Cited

U.S. PATENT DOCUMENTS

| | | | | |
|---|---|---|---|---|
| 7,628,954 | B2 * | 12/2009 | Gomm ................. | G01N 35/025 422/63 |
| 7,842,504 | B2 * | 11/2010 | Devlin, Sr. ......... | G01N 35/0092 436/47 |
| 2002/0014081 | A1 | 2/2002 | Jones et al. | |
| 2002/0169518 | A1 * | 11/2002 | Luoma, II ........ | G01N 35/00732 700/218 |
| 2006/0105359 | A1 | 5/2006 | Favuzzi et al. | |
| 2010/0183408 | A1 | 7/2010 | Malin | |
| 2010/0303590 | A1 | 12/2010 | Pedrazzini | |
| 2011/0088424 | A1 | 4/2011 | Cloutier et al. | |
| 2012/0060514 | A1 | 3/2012 | Warhurst et al. | |
| 2012/0060539 | A1 | 3/2012 | Hunt et al. | |
| 2012/0219473 | A1 * | 8/2012 | Ishii .......................... | B01L 7/00 422/561 |
| 2013/0240181 | A1 * | 9/2013 | Yasunaga ................ | F28D 15/00 165/104.28 |
| 2014/0113278 | A1 * | 4/2014 | Thomas .................... | B01L 9/06 435/5 |
| 2014/0274809 | A1 * | 9/2014 | Harvey .................... | B01L 3/502 506/26 |
| 2014/0286124 | A1 * | 9/2014 | Donohue ........... | G01N 35/1002 366/342 |
| 2015/0037803 | A1 * | 2/2015 | Park ..................... | C12Q 1/6804 435/6.12 |
| 2015/0233956 | A1 | 8/2015 | Buehr | |
| 2015/0362516 | A1 * | 12/2015 | Meyer ................ | G01N 35/1065 436/47 |
| 2016/0238625 | A1 * | 8/2016 | Raicu ....................... | B65G 1/06 |

FOREIGN PATENT DOCUMENTS

| | | |
|---|---|---|
| CN | 101379403 A | 3/2009 |
| CN | 101970957 A | 2/2011 |
| CN | 101971036 A | 2/2011 |
| CN | 102271813 A | 12/2011 |
| CN | 102576030 A | 7/2012 |
| CN | 102954954 A | 3/2013 |
| CN | 203022437 U | 6/2013 |
| CN | 103250056 A | 8/2013 |
| CN | 103308377 A | 9/2013 |
| CN | 203487900 U | 3/2014 |
| CN | 103926416 A | 7/2014 |
| CN | 104089804 A | 10/2014 |
| CN | 205128020 U | 4/2016 |
| DE | 4234558 A1 | 4/1994 |
| DE | 202007008595 U1 | 8/2007 |
| DE | 102011050774 A1 | 12/2012 |
| JP | 2000-074802 A | 3/2000 |
| JP | 2000-187038 A | 7/2000 |
| JP | 2002-513936 A | 5/2002 |
| JP | 2005-292118 A | 10/2005 |
| JP | 2009-092297 A | 4/2009 |
| JP | 2013-502566 A | 1/2013 |
| TW | 201037309 A | 10/2010 |
| WO | 99/57561 A2 | 11/1999 |
| WO | 2015069549 A1 | 5/2015 |

OTHER PUBLICATIONS

Extended EP Search Report dated Feb. 27, 2020 of corresponding European Application No. 17831834.1, 8 Pages.

* cited by examiner

MECHANISM FOR STORAGE OF REFRIGERATED CALIBRATION AND QUALITY CONTROL MATERIAL

CROSS-REFERENCE TO RELATED APPLICATION

This application claims priority to U.S. Provisional Patent Application No. 62/365,304 filed on Jul. 21, 2016, the contents of which are hereby incorporated by reference in its entirety.

BACKGROUND

In vitro diagnostics (IVD) allows labs to assist in the diagnosis of disease based on assays performed on patient fluid samples. IVD includes various types of analytical tests and assays related to patient diagnosis and therapy that can be performed by analysis of a liquid sample taken from a patient's bodily fluids, or abscesses. These assays are typically conducted with automated clinical chemistry analyzers (analyzers) onto which fluid containers, such as tubes or vials, containing patient samples have been loaded. The analyzer extracts a liquid sample from the vial and combines the sample with various reagents in special reaction cuvettes or tubes (referred to, generally, as reaction vessels). In some conventional systems, a modular approach is used for analyzers. A lab automation system can shuttle samples between one sample processing module (module) and another module. Modules may include one or more stations, including sample handling stations and testing stations (e.g., a unit that can specialize in certain types of assays or can otherwise provide testing services to the larger analyzer, which may include immunoassay (IA) and clinical chemistry (CC) stations. Some traditional IVD automation track systems comprise systems that are designed to transport samples from one fully independent module to another standalone module.

In addition to patient samples, analyzer modules in an IVD analyzer system also utilize calibrators and controls. A calibrator is a fluid that is used to calibrate a reagent pack. For example, various reagents can have some degree of variance between manufacturing lines. Calibrators are used by an analyzer or instrument to calibrate test results based on those variations, using the calibrator variations as a reagent lot. A control calibrates the instrument itself. Whereas a calibrator is typically used each time a reagent pack is switched to a different lot, a control is used each time an instrument needs calibration. This is typically done at regular intervals, such as once per shift of a laboratory or once every 200 samples, for example. Because calibrators and controls are not used very frequently, these fluids need to be stored for extended periods of time, such as two weeks, or up to 30 to 45 days. Often, these require refrigeration to keep them stable. Traditionally, calibrator and control fluids were maintained in the laboratory refrigerator and an operator can introduce these fluids to an analyzer when calibration was necessary. However, with an increased importance of automation in modern systems, it is desirable to have refrigerated storage for long-term holding of controls and calibrators that is easily accessible to an automation system.

SUMMARY

Embodiments of the present invention provide refrigerated storage of control and calibrator fluids that can be accessed by a robot arm when an automated clinical analyzer has need of these fluids.

According to one embodiment, a refrigerated storage assembly for integration into a clinical analyzer includes an insulated housing, an insulated door assembly comprising one or more doors, one or more thermoelectric coolers, and a refrigerated base assembly contained within the insulated housing and beneath the insulated door assembly. The refrigerated base assembly includes a metal plate thermally coupled to the one or more thermoelectric coolers, one or more thermal sensors, and a plurality of receptacles arranged in an array, each receptacle configured to receive one of a plurality of fluid tubes. When the one or more doors are closed, the refrigerated base assembly provides a refrigerated environment configured for multi-day storage of at least one of a control and a calibrator fluid contained within the plurality of fluid tubes. Individual evaporation covers for each tube are provided to mitigate evaporation from long-term storage. These covers can be independently removed via a robot arm that is also used to extract the tubes for placing those tubes into an automation system for use by other systems within the clinical analyzer.

According to one aspect of some embodiments, the insulated door assembly includes a first and a second door that open and close in a sliding manner. In some embodiments, the first and second doors are controlled by a motor and a rack and pinion gear mechanism. In some embodiments, the door assembly is configured to be opened when a robot arm moves the first door, the second door being coupled to the first door via a rack and pinion gear mechanism.

In some embodiments, the refrigerated storage assembly includes three thermoelectric coolers, each cooler comprising a Peltier cooling device, a fan, and a heatsink. In some embodiments, the refrigerated storage assembly includes a plurality of evaporation covers that are configured to be placed over each of the plurality of fluid tubes. In some embodiments, the plurality of evaporation covers include a polymer material (such as plastic) and one or more magnets that magnetically couple to the refrigerated base assembly. In some embodiments, the plurality of evaporation covers are configured such that each evaporation cover does not touch each of the plurality of fluid tubes when placed onto the refrigerated base assembly.

In some embodiments, a plurality of channels and at least one drain are provided, wherein the plurality of channels and the at least one drain are configured to remove condensation from within the insulated housing. In some embodiments, the plurality of receptacles each comprise a V-shaped wall and a spring that pushes each of the fluid tubes into the V-shaped wall.

According to another embodiment, a sample handler module for use in an in vitro diagnostics (IVD) analysis system includes a robot arm, a plurality of input drawers configured to receive trays of sample fluids, and a refrigerated storage assembly configured to store at least one of a control and calibrator fluid for multi-day storage. The refrigerated storage assembly includes an insulated housing, an insulated door assembly comprising one or more doors, one or more thermoelectric coolers, and a refrigerated base assembly contained within the insulated housing and beneath the insulated door assembly. The refrigerated base assembly includes a plate thermally coupled to the one or more thermoelectric coolers, one or more thermal sensors, and a plurality of receptacles arranged in an array, each receptacle configured to receive one of a plurality of fluid tubes.

According to another embodiment, a method for storing at least one of a control and calibrator fluid includes steps of opening an insulated door assembly to a refrigerated chamber, lifting at least one of a plurality of evaporation covers contained within the refrigerated chamber using a robot arm, and placing at least one of a plurality of fluid tubes containing at least one of a control and a calibrator fluid into one of a plurality of receptacles in the refrigerated chamber. Further steps include replacing the at least one of a plurality of evaporation covers over the at least one of a plurality of fluid tubes, closing the insulated door assembly to the refrigerated chamber, and regulating temperature of the refrigerated chamber using at least one thermoelectric device.

DETAILED DESCRIPTION OF THE EMBODIMENTS

Figure 1:
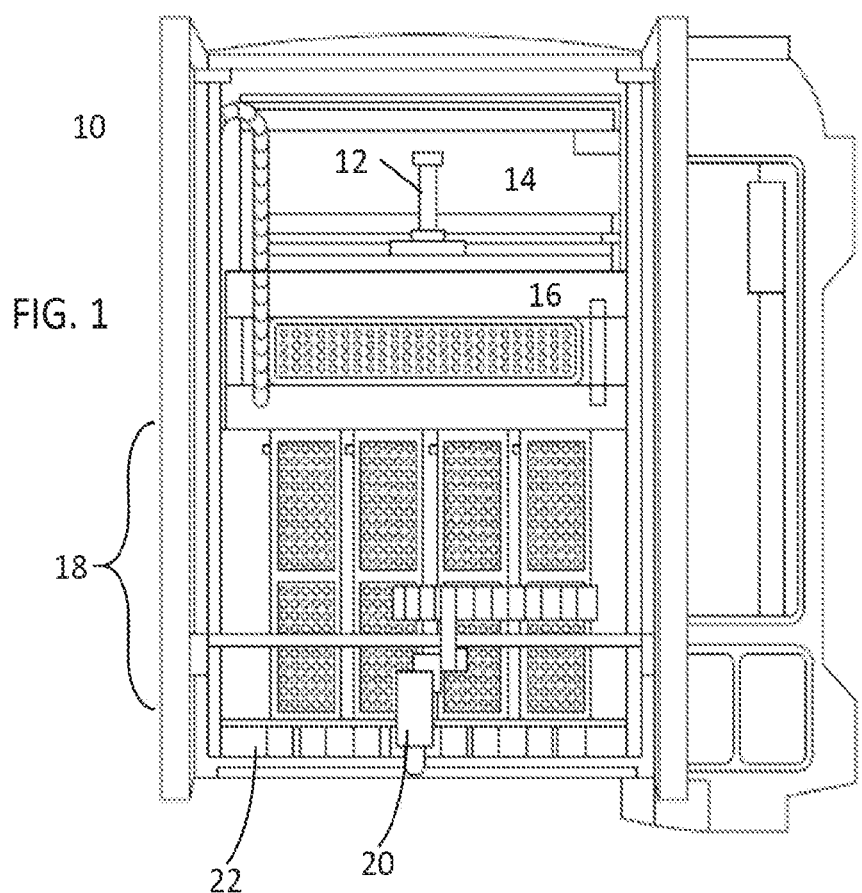
FIG. 1 is a top down view of an exemplary sample handler that may be used with some embodiments.

Embodiments utilize a mechanism to store calibrator and quality control material in a thermally-managed environment where they can remain stable and usable for their defined stability period (in some embodiments, 7-14 days). In some embodiments, this stability period is much longer, up to 30-60 days. An exemplary module can store up to 60 5 mL vials with a less than 1% evaporation over the defined stability range. To accomplish this goal, refrigeration systems and evaporation mitigation mechanisms are used.

Control and calibrator storage includes a refrigerated module designed to keep quality control (QC) material cool while, at the same time, minimizing evaporation of QC material and light exposure. In some embodiments, the control storage module is located in the sample handler, and may be referred to, generally, as refrigerated storage. When viewed from the front of the sample handler, the module is located behind the sample loading area and in front of a tube characterization station. Control storage can be accessed by a sample handler robot arm. In general, users do not have access to the control storage module directly (except in the event of system failure where the QC material cannot be removed from the module with the sample handler robot). The control storage module is generally designed to store control and calibrator vials. Vials/tubes fit into a thermally conductive tube basis subassembly (e.g., a thermally conductive plate having recesses to receive tubes), which is cooled using thermoelectric devices attached to the refrigerated storage subassembly. A control access door assembly allows the sample handler robot to access QC materials. The cover can further insulate the module and provide a light barrier. To further prevent evaporation, the subassembly can have a set of movable evaporation covers that sit over each QC tube.

Refrigerated storage for controls and calibrators provides long-term storage of multiple days for controls and calibrators in sample tubes. In some embodiments, the refrigerated control storage module is a subassembly contained within the sample handler space, whose primary function is to provide a refrigerated space for up to 60 sample tubes containing either quality control material (QC) or calibrator material. In some embodiments, sample tubes or QC tubes, will be stored in this compartment once identified by the system Tube Characterization Station (TCS) for up to 7 days, or the length specified by their instructions for use (IFU), whichever is shorter.

Each control or calibrator is a custom solution for calibrating a specific instrument or chemical assay within the clinical analyzer. Examples of calibrators include, but are not limited to albumin calibrators, alkaline phosphatase calibrator, various enzyme calibrators, various protein test calibrators, various toxicology calibrators, immunoassay and microglobulin calibrators, cholesterol calibrators, etc. Exemplary controls include multidrug urine controls or other simulated bodily fluids with known concentrations of analytes.

QC and calibrator material can be used to intermittently calibrate and verify quality control of certain instruments within the clinical analyzer. This material typically must be refrigerated to a uniform temperature to verify effectiveness of calibration. Because calibration is done intermittently in the system, it is helpful to store QC and calibrator material in a refrigerated compartment accessible to a sample handling robot. QC and calibrator material can be stored in individual sample tubes containing material, allowing these tubes to be transported via the same vessel mover mechanisms as patient samples. The control storage module maintains a 4° C. to 8° C. environment with a <4° C. gradient in sample tubes stored within it (gradient applied only to tubes stored long enough to reach steady state). This is accomplished by providing a refrigerated humidity/evaporator controlled environment in refrigerated storage in the sample handler module. In some embodiments, by providing an enclosed refrigerated environment with evaporation covers for each tube, controls and calibrators can be stored without substantial degradation or evaporative loss for at least 14 days.

In some embodiments, the following features create the specific framework for the problem to be solved. In some embodiments, the sample handler module (SH) maintains the temperature of the refrigerated onboard storage between 4-8 degrees C. An exemplary SH provides storage conditions for QC/Calibrator products that limit evaporative loss to <1% of a 5 ml starting volume during the onboard storage period. An exemplary SH provides a minimum of 60 onboard storage positions for quality control and calibrator material vials, in total. An exemplary SH provides the ability to use the onboard storage positions for calibrator and quality control material in any combination. An exemplary SH maintains refrigerated compartment temperature control in the "Standby" state. An exemplary SH provides temperature controlled environments with an access point for independent temperature verification that is within reach of a user. An exemplary SH monitors storage usage and reports pertaining to the SH drawer (where samples, controls, and calibrators are inserted), automation system components, and control storage.

The SH utilizes thermoelectric (TE) coolers to create a refrigerated storage area. Individual covers can be placed on top of each stored control and calibrator, which mitigates evaporation. Furthermore, a cover that is opened and closed by movement of the sample handling robot assists in maintaining temperature and mitigating evaporation.

FIG. 1 shows a top down view of an exemplary sample handler 10 that may be used for some embodiments. Within this figure, sample handler 10 is oriented so that the front (i.e., the face that the operator interacts with) is oriented at the bottom of the page, while the automation track is located at the top of the page. Sample handler 10 includes a tube characterization station 12 at the robot/track interface. Tube characterization station 12 characterizes tubes and carriers when tubes are placed on carriers on track 14. This allows information to be ascertained about the identity of the tube placed in each carrier, and the physical condition of each tube (e.g., size of the tube, fluid level, whether there is a tube top cup, etc.) Adjacent to the tube characterization station 12, sits a control/calibrator storage region 14. This allows long-term refrigerated storage of control and calibrator fluids near the track, allowing these fluids to be easily placed into carriers on the track for movement to relevant locations in the analyzer. The location of storage 16 also allows input/output drawers 18 to be placed in the front of sample handler 10. In this example, there are four adjacent drawers 18 that can be individually opened and pulled out.

A robot arm 20 can move in two dimensions to pick up any of the tubes in drawers 18 and move those tubes to and from storage 16 and carriers on track 14. Robot arm 20 can be positioned by moving a gantry from the front to the back of a sample handler 10 while a carriage moves side to side along that gantry. Opposable end effectors can then be moved vertically to reach down to pick up tubes, closing the end effectors when they are properly positioned to engage the tube.

To assist the robot arm 20 in successfully engaging each tube, a drawer vision system 22 is placed above the drawers at the opening to the drawers. This allows a series of images to be taken, looking down at the tubes in the trays, as the trays are moved past the drawer vision system. By strobing a series of cameras, multiple images can be captured in a buffer, where each tube appears in multiple images. These images can then be analyzed to determine the physical characteristics of each tube. For example, diameters and heights of each tube can be determined. Similarly, the capped or uncapped states of each sample can be quickly determined. Furthermore, the presence or absence of a tube top cup (a small plastic well that is placed on top of a tube to allow a tube to transport a much smaller volume with greater depth of the sample, to allow aspiration to more easily take place) can be ascertained. Similarly, the characteristics of any cap can be ascertained by the images. This can include certain color markings on the cap to identify a given sample as a higher priority (STAT) sample.

The module manager process controller (PC) can utilize this information to schedule samples to be moved from each tray in drawers 18 into carriers on track 14. The module manager PC can also instruct robot arm 20 how to interact with each tube, including identifying the proper height for the end effectors before engagement, and the proper force or distance to use when engaging the end effectors to accommodate multiple diameters of tubes.

In some embodiments, when a sample is determined to be of a fluid type that requires refrigeration, or where a scheduling algorithm determines that refrigeration is needed because of a delay in processing that sample, robot arm 20 can move that sample from drawers 18 (or from a carrier on track 14 if already on the track) into temporary storage in refrigerated storage 16. In some embodiments, refrigerated storage 16 is only used for control and calibrator storage. In some embodiments, a determination of whether or not to store samples in refrigerated storage 16 depends on the available space storage 16 (i.e., the space not taken by controls and calibrators), allowing space to be dynamically allocated to mixed-use, as appropriate.

In some embodiments, refrigerated storage 16 includes a thermoelectrically controlled plate having an array of recesses configured to receive sample tubes. For example, this plate can be a block of aluminum or steel that has been machined to have a series of cylindrical receptacles sized to hold sample tubes. This aluminum or steel block can then be coupled to thermoelectric coolers, such as Peltier devices, and thermocouples/temperature sensors, to control temperature of the aluminum plate, and thereby control the temperature of fluid stored in sample tubes held in that plate. Meanwhile, an insulated lid that can be opened by a motor (or other means, as described herein) is placed on top of the storage area. This allows sample tubes to be placed into the refrigerated plate and removed from the refrigerated plate without restriction, but the volume of refrigerated storage is generally insulated and closed, much the way a refrigerator is. In some embodiments, the tubes in refrigerated storage 16 can be protected against evaporation by placement of lids, such as loose-fitting lids for each tube held in place by gravity or magnets, that can be placed and removed by robot arm 20.

Figure 2:
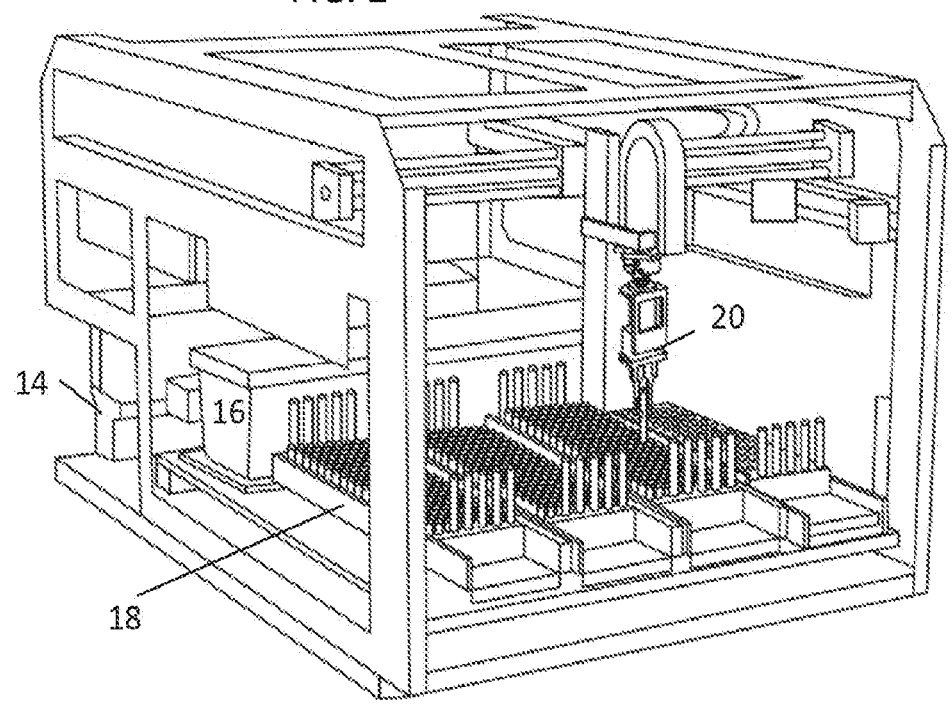
FIG. 2 is a perspective view of a sample handler that may be used with some embodiments.

FIG. 2 is a perspective view of a sample handler 10. In this example, track 14 is roughly parallel with the front face of drawers 18, while refrigerated storage 16 is a large physical object between drawers 18 and track 14. Meanwhile, robot arm 20 is moved on supports well above the height of drawers 18 and refrigerated storage 16. Tube characterization station 12 and Drawer Vision System (DVS) 22 are not shown in FIG. 2, to allow the internals of sample handler 10 to be better understood.

In some embodiments, drawers may be designated for certain tasks in software. For example, the processor controlling sample handler 10 can be configured to identify any of the four drawers as sample input, sample output, or sample input/output. By designating certain drawers as dedicated to input or output, samples may be loaded in one location to start a batch, and removed from another location when the samples are complete. Once an output tray is removed after being full, software can then designate the respective drawer as an input lane, thereby allowing an operator to replace a withdrawn tray with a fresh tray of additional samples to test.

Figure 3:
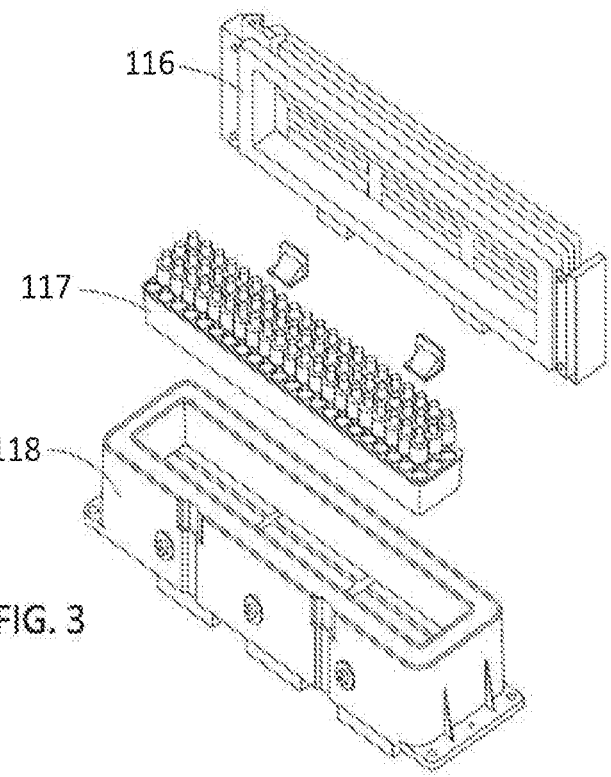
FIG. 3 is a perspective exploded view of an exemplary embodiment of a control and calibration storage (CCS) module of the sample handler.

FIG. 3 is a perspective exploded view of an exemplary embodiment of a control and calibration storage (CCS) module 120 of the SH. The SH CCS is a refrigerated module designed to store control & calibrator (CC) material while, at the same time, minimizing evaporation of CC material and minimizing light exposure. The subsystem is located within the SH. The device is accessed by the sample handler robot. Users generally do not have to access this module directly except in the event of system failure where the QC material cannot be removed from a module with the sample handler robot. The primary components of control storage module 120 are tube access door assembly 116, which covers tube and evaporation cover base assembly 117 (tube assembly), which is contained in the base assembly 118, which forms a cold chamber. Tube access door assembly 116 provides a sealed door to contain control and calibrator tubes. Tube assembly 117 includes a stainless baseplate having a plurality of recesses to receive control and calibrator tubes and provide a thermal sink to chill these tubes. In addition, individual evaporation covers that are sized to engage the tube base assembly are placed above each tube. These covers are sized so as not to make direct contact with the tubes to avoid cross contamination. Base assembly 118 of the cold chamber includes a housing having insulated walls and mounting positions for thermoelectric coolers (TECs) that are in thermal contact with the stainless base of base assembly 118. Each TEC is driven by a thermoelectric devices controlled in a feedback loop to maintain a desired temperature.

Figure 4:
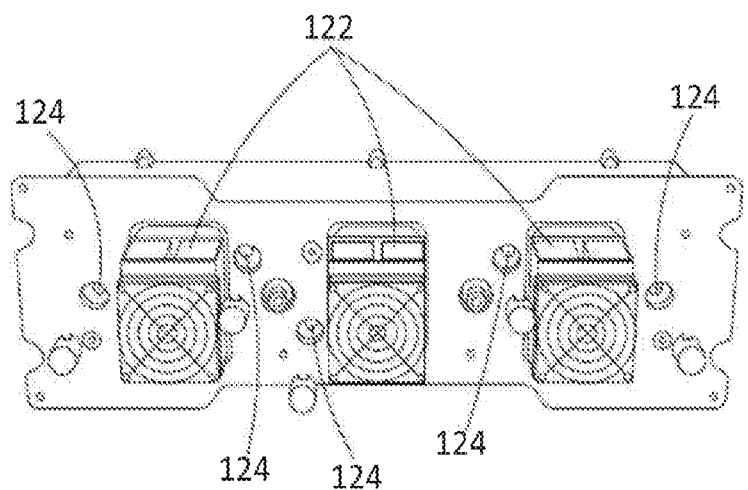
FIG. 4 is a bottom view of an exemplary embodiment of a control and calibration storage (CCS) module of the sample handler.

FIG. 4 is a perspective view of the bottom of an exemplary cold chamber assembly. In this example, five thermistors are used, placed in a predetermined pattern in the base of the cold chamber assembly. These thermistors are coupled directly to the metal cold plate within the assembly. Thermoelectric devices are placed in a predetermined arrangement to provide thermal cooling throughout the area of the cold plate. In this embodiment, three thermoelectric devices (TEDs) are responsible for cooling refrigerated storage used for storing control and calibrators. Each thermoelectric device is an assembly comprising a thermal pad, one or more Peltier modules, heatsink fins, and a fan to remove heat from the fins. Modules comprising each TED and heatsink hardware are identified as TED module 122 in FIG. 4. Cooling occurs due to the Peltier effect, which works by passing electric charge through a junction of two different conductors, creating a hot side and a cold side. The cooled surface is thermally connected by pinching a graphite thermal pad between a TED cold surface and a cold plate mounting surface. The hot side is connected to a series of fins, which allow air to be blown and remove heat. The series of thermistors 124 can be placed throughout the bottom of the cold plate. For example, three can be mounted directly to the mounting blocks for the TEDs, and two additional thermistors can be located near the ends of the system for additional measurement capability. A control module can then utilize the thermal input from each thermistor 124 to provide control to activate TEDs 122. Various thermal tuning approaches as known in the art can be applied. In some embodiments, a potential integral differential (PID) controller is used to control each TED 122. In some embodiments, a local averaging of thermistor values can be used to provide individual control to each individual TED. In some embodiments, an average of all thermistors can be used to control all TEDs in unison. Other exemplary control approaches include using a proportional controller, a proportional integral controller, and a simple threshold thermocouple approach.

The CCS consists of three assemblies: tube access door assembly, the cold chamber assembly, and the tube and evaporation cover (TEC) base assembly. The tube access door assembly is insulated, helps maintain the temperature within the system, and also protects CC material from light exposure. In some embodiments, it is intended to be opened by the SH robot. Various embodiments of the tube access door assembly are discussed throughout. The doors form a lid that is preferably an insulated structure that, along with an insulated housing of the cold chamber assembly, forms a closable insulated shell for the tube and evaporation cover assembly inside. The tube and evaporation cover base assembly is actively cooled via thermoelectric cooling.

Figure 5A:
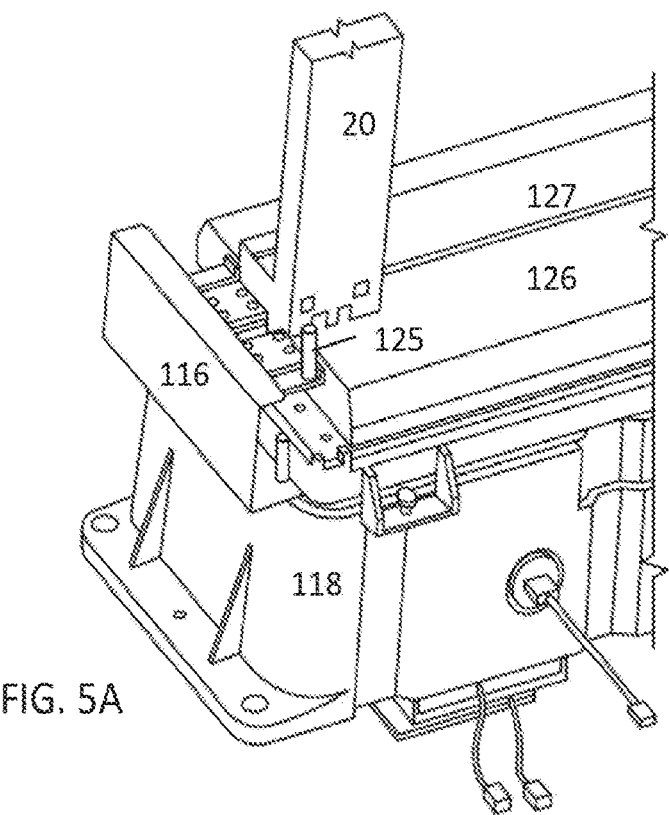
FIGS. 5A and 5B are perspective views of a robot arm gantry engaging and opening the sliding doors of the tube access door assembly for use with some embodiments.
Figure 5B:
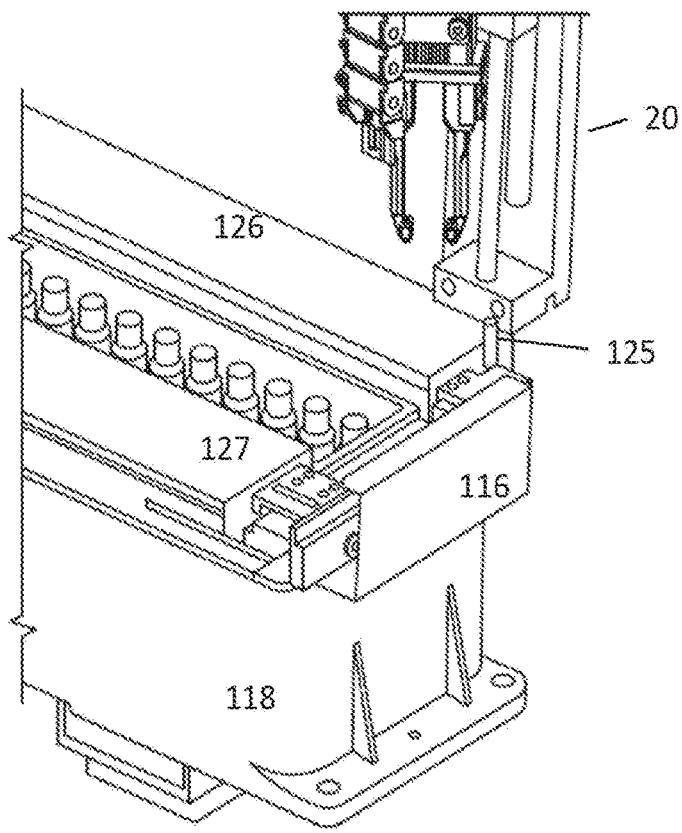

While FIG. 3 shows the tube access door assembly in an opened state with hinges, once lowered into place (i.e., the hinges are closed), the tube access door assembly can be opened in a sliding manner, such as shown in FIGS. 5A and 5B. In some embodiments, the sliding mechanism is passive and must be opened via external action, such as motion by robot gantry 20, while, in others, the sliding mechanism is active, being activated via a motor that drives a pinion. FIGS. 5A and 5B are perspective views of the robot arm gantry engaging and opening the sliding doors of the tube access door assembly. A mechanical member of the bottom of the gantry of the SH robot 20 engages a pin 125 rigidly coupled to one of the doors (such as doors 126 or 127 or door assembly 116) of the CCS, causing a rack and pinion to move one door horizontally the direction of pin movement, opening the door coupled to the pin, and move the other door in the opposite direction. The rack and pinion relationship can be understood with reference to FIGS. 6A and 6B.

As shown in FIG. 5A, robot arm gantry 20 applies a horizontal force to pin 125 when it the gantry moves into position. After contacting the side of pin 125, robot arm 20 moves in the direction of opening of door 126, which is rigidly coupled to pin 125 and moves along a linear slide relative to the housing of the door assembly 116. Pin 125 can be of any suitable shape for engaging robot arm 20, such as round or flat or shaped to mate a corresponding surface of the gantry. As pin 125 is moved horizontally by robot arm 20, a rack and pinion mechanism (shown in detail in FIGS. 6A and 6B) causes door 127 to move in the opposite direction along linear slides, opening the doors to allow access to the controls and calibrators stored therein. Doors 126 and 127, along with the opening and sliding mechanism form door assembly 116.

Figure 6A:
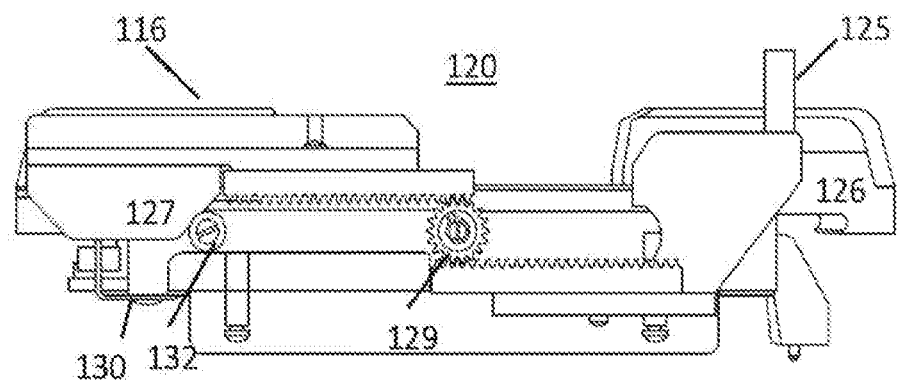
FIGS. 6A and 6B are side view cutaway of the mechanical coupling between two doors of an exemplary embodiment of a refrigerated storage.
Figure 6B:
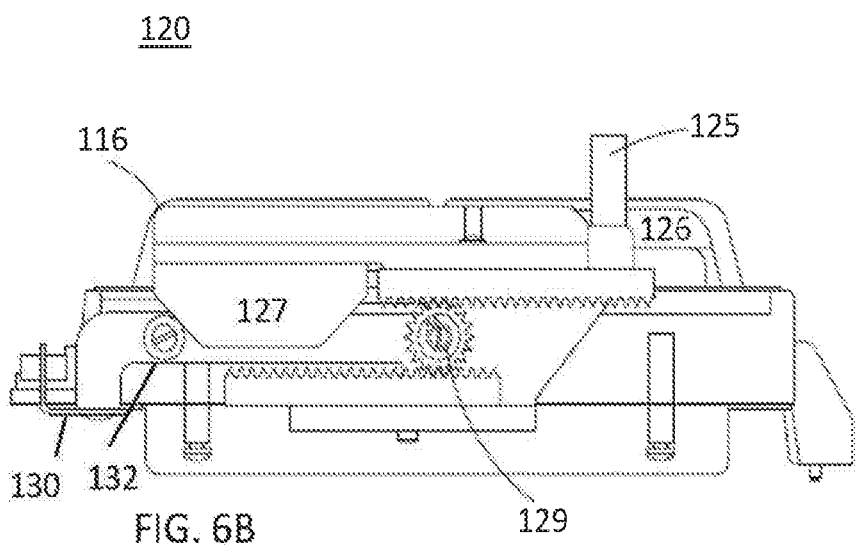

FIGS. 6A and 6B are a side view cutaway of the mechanical coupling between two doors of the CCS. As illustrated in FIGS. 6A and 6B, doors 126 and 127 are linked via a rack and pinion 129. The gantry moves the first door 126, which couples to the other door 127 via the rack and pinion 129, causing the both doors to slide open. In some embodiments, a flat spring 130 coupled to the second door 127 provides force on a cam 132, via a cam arm. When the doors are closed, cam 132 translates the spring force against a sloped feature in the door 127 to help hold it closed. When open, the cam translates the spring force to the opposite side of the same door feature to help ensure the doors stay open.

In some embodiments, the movement of the cam arm also moves a pin in and out of one of a door sensor. This door sensor is blocked when the door is fully open and fully closed. It is unblocked when the doors are moving. This provides an electrical signal feedback to identify the state of the doors, open or closed. In some embodiments, a second sensor is blocked when the doors are closed.

Figure 7:
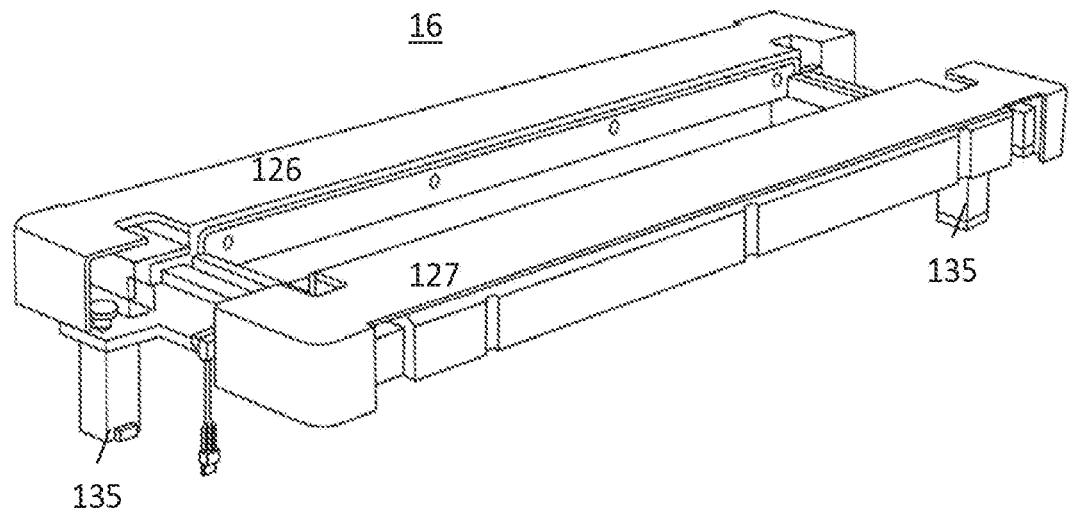
FIG. 7 is a perspective view of an exemplary door opening mechanism for use with some embodiments.

FIG. 7 is a perspective view of another embodiment of access doors of the CCS. In this embodiment, a geared motor 135 rotates to form the pinion of a rack and pinion system that translates to linear actuation of doors 126 and 127. In this embodiment, the doors are opened in response to an electrical control signal, rather than mechanical interaction with the gantry of the robot arm in the SH. In some embodiments, two motors rotate in the same direction on opposite sides of each door, causing the opening or closing action and responsiveness rotation. By synchronizing these motors, door movement can be synchronized and racking can be mitigated.

In some embodiments, a common alignment pin is used to mechanically engage the doors in a closed position to ensure that they line up, forming a mechanical seal that mitigates thermal loss. In some embodiments, upper and lower seal channels in door assembly 116 provide alignment for door seals, allowing gaskets of O-rings to provide an airtight. This mitigates thermal loss. Doors and housing surfaces are generally insulated to mitigate thermal loss.

Figure 8:
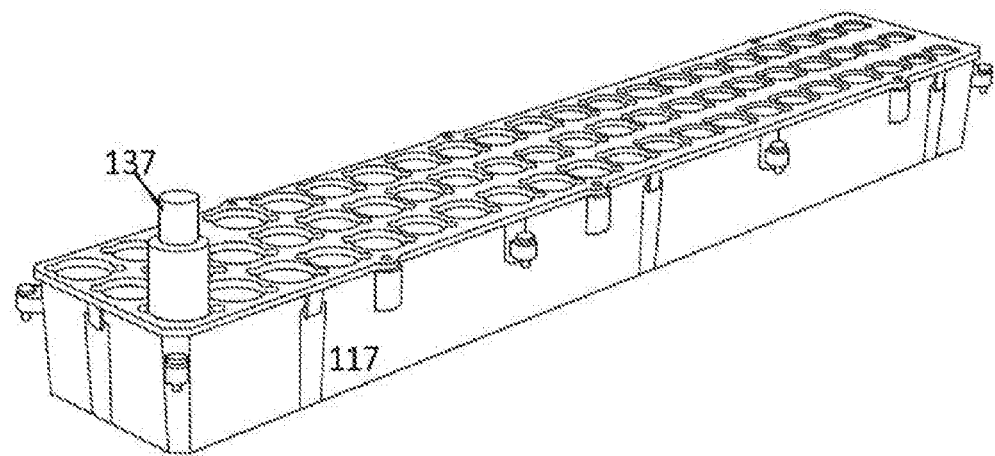
FIG. 8 is a perspective view of the tube and evaporation cover base assembly for use with some embodiments.

FIG. 8 is a perspective view of tube assembly 117. In this example, a single evaporation cover 137 is illustrated. Evaporation covers 137 are made of a rigid material, such as ABS plastic or other suitable polymers, and the size and shape to the rest in recesses of top plate 138. In some embodiments, the base and evaporation covers 137 can be constructed of a gasket material to create a more airtight seal when placed in the recesses. With or without gasket, evaporation covers 137 rest securely in alignment with tubes stored within the tube assembly 117 to act as a lid and mitigate movement of air that creates evaporation. Once evaporation covers 137 are put in place, the environment surrounding each tube equilibrates to a reasonable humidity to prevent unnecessary evaporation of controls or calibrators stored therein. Evaporation can change the density or concentration of substances held in solution. Accordingly, evaporation should be mitigated to ensure controls and calibrators are stored without altering the properties when placed in the refrigerated storage for multiple days.

Figure 9:
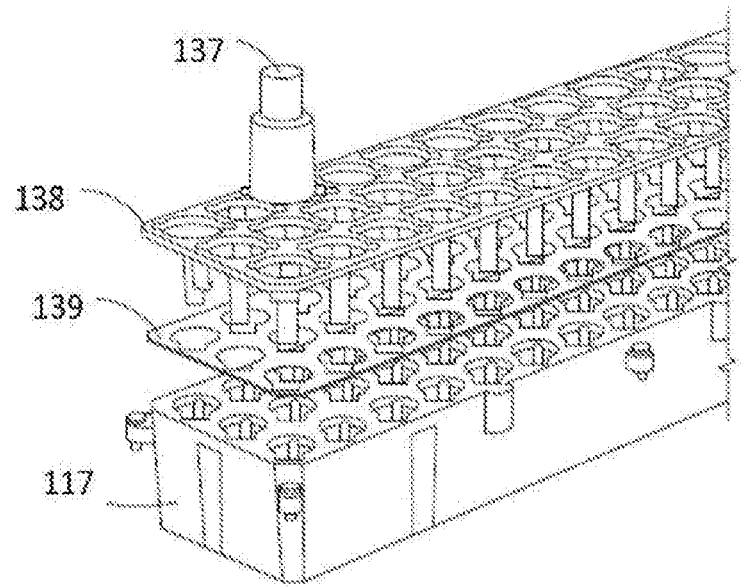
FIG. 9 is an exploded perspective view of the tube and evaporation cover base assembly for use with some embodiments.

FIG. 9 is an exploded perspective view of tube assembly 117. Evaporation covers 137 are configured to rest in recesses of top plate 138. Top plate 128 can be a plastic array of openings that provides a protective top sheet to tube assembly 117. The openings are sized to accept evaporation covers 137. Beneath top plate 138, stainless steel strike plate 139 includes an array of holes that are sized smaller than those of top plate 138. Evaporation covers 137 will rest on the ledge created due to the differences in sizes of these openings. In some embodiments, evaporation covers 137 are made out of a plastic material, but include one or more magnets at the base of the cover to provide a magnetic force between evaporation covers 137 and strike plate 139. This allows covers 137 to be securely mated to strike plate 139. Robot arm 20 can access control calibrators stored in tube assembly 117 by using end effectors to remove each evaporation cover 137, placing that cover on a nearby shelf, and then engaging the tube underneath using the end effectors for removal. The external surface of evaporation covers 137 can be of any suitable texture or shape to allow the end effectors to easily remove each cover.

Tube assembly 117 includes a plurality of recesses sized to accept control and calibrator tubes. In some embodiments, these recesses include two vertical walls forming a "v" and, opposite that "v," a leaf spring that provides a holding force. By using a "v" and the spring, tubes stored in these recesses can be held upright in a repeatable position for more accurate engagement by the robot arm.

In general, removable evaporation covers sit atop a strike plate, divided by an easily cleanable cover (such as a dense molded plastic cover). In some embodiments, covers have fixtures for engagement with the stainless steel strike plate. In some embodiments, the cover includes the springs that will apply a holding force for the tubes. In some embodiments, the cover and strike plate are molded or machined from a single monolithic material or glues/sonically welded to form a single rigid plate. Beneath the strike plate, the base provides wells in which tubes reside. When doors 126 and 127 open, the SH robot will have access to all three rows of evaporation covers and control and calibrator (CC) tubes. If manual access is required, the entire door assembly rotates on hinges toward the SH drawers, allowing full access to the tubes and evaporation covers from the back of the SH.

The door assembly mounts on the cold chamber assembly. CC tubes are placed by the SH robot into empty positions within the TEC Base. In some embodiments, the base has 63 (21×3) positions and is thermally connected to the cold chamber assembly. The SH Robot moves permanent evaporation covers over the CC tube to minimize CC material evaporation, protect materials from light exposure, and help maintain temperature of the fluid. In some embodiments, for operation, there should be at least one fewer evaporation cover than there are tube slots. This allows a cover to be placed over an empty slot to retrieve a sample from under a cover.

The evaporation covers have molded-in magnets that attract and seat to a steel plate at the top of the TEC Base. Other than the steel plate, the TEC Base is made from aluminum. The top of the base is molded and has a lead in to help capture Evaporation Covers during SH robot place operations. The TEC Base tube slots have a retaining spring designed to push a CC tube into a "V" shape, allowing for better pick accuracy of the SH Robot. The slots are open at the bottom, allowing condensate to flow down into the cold chamber assembly.

In some embodiments, plate 139 is a ferritic steel plate that sits below a protective cover 138 to provide a magnetic base to couple to magnets in the evaporation covers that fit above each control/calibrator tube. Within the control tube base, each slot includes a tube spring to provide a holding force for control and calibrator tubes. In some embodiments, tube slots within the base are placed in a 30×28 mm array.

Figure 10:
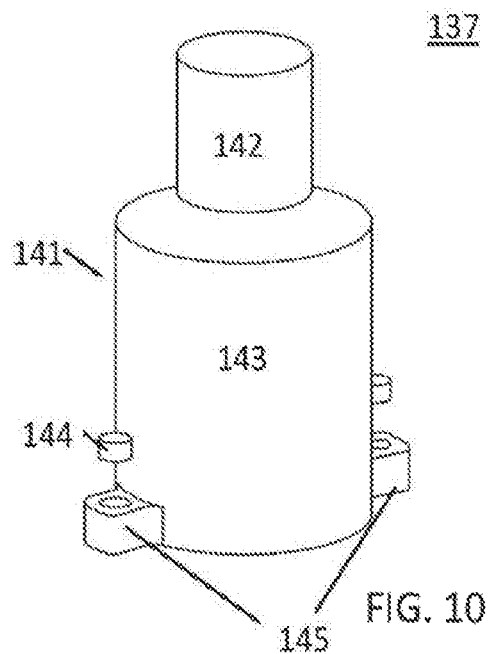
FIG. 10 is a perspective view of an exemplary evaporation cover for use with some embodiments.

FIG. 10 is a perspective view of an exemplary evaporation cover. Evaporation cover 137 comprises a molded or machined body 141. This housing is generally hollow and substantially cylindrical. Exemplary shapes can include various diameters to improve the ability of end effectors to grasp the covers. In this example, the top portion 142 has a narrower diameter than bottom portion 143. Bottom portion 143 is sized so that the hollow recess within is larger than the diameter needed to fit over a sample tube. In some embodiments, upper portion 142 has a diameter that is substantially similar to the diameter of a sample tube (e.g., within a range of about 20% smaller and 20% larger than the smallest and largest tube diameters handled by the system) allowing the end effectors to grasp the object having a diameter substantially similar to that of the tube contained therein. The larger diameter bottom portion has a diameter that is substantially larger (e.g., having sufficient diameter for a given wall thickness that a hollow interior has a an inner diameter at least 5% greater than the largest tube diameter that will be covered) than a sample tube, allowing the inner hollow portion of cover 137 to be placed over the top of a control and calibrator to, with additional space between the walls of cover 137 and the outside of the tube. In some embodiments, rare earth magnets 144 are placed at two or more locations on the outer surface or inside body 141. This can allow a magnetic holding force to keep cover 137 in place and aligned once placed there by the robot arm. Alignment tabs 146 can be molded into body 141 to provide a base that helps align magnets 144 to ensure a magnetic holding force exists. In some embodiments, it is assumed that evaporation covers 137 will be placed in a random orientation by the robot arm. Accordingly, alignment tabs 146 can include three or more tabs resulting in an outer diameter of the base of body 141 that is still less than the size of the opening in cover plate 138. In some embodiments, it is assumed that the robot arm will not substantially rotate each evaporation cover once the robot arm picks and places it, allowing alignment tabs 146 to fit into the corresponding keyed slots in cover plate 138. Because the evaporation covers sit on the control tube base, and are centered due to openings in the cover plate and secured magnetically to the steel plate, evaporation covers can be sized appropriately to prevent any touching of the control tube being covered. This can prevent carryover between controls or calibrators.

Figure 11:
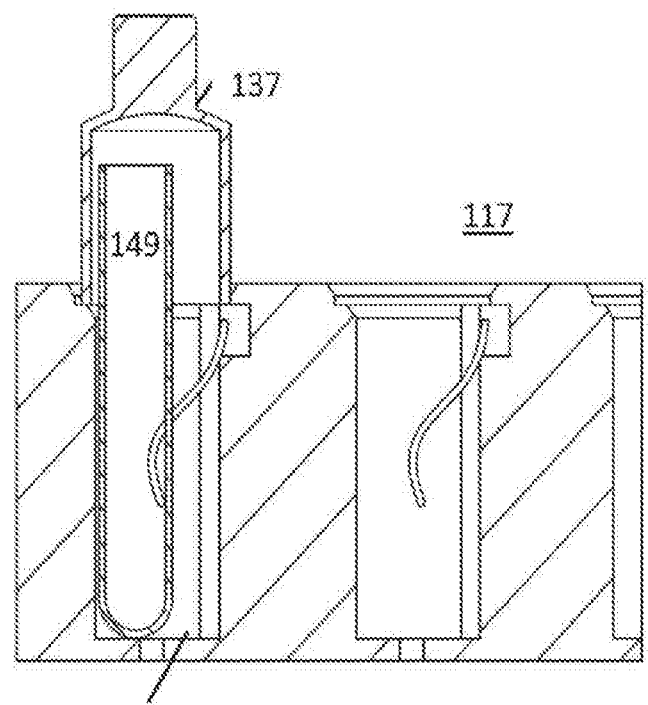
FIG. 11 is a cutaway view of an exemplary evaporation cover for use with some embodiments.

FIG. 11 shows a cross-sectional view of an evaporation cover engaged with tube assembly 117. Within a tube slot 147, calibration tube 149 is held in place via a spring. Evaporation cover 137 is placed on top of tube assembly 117 such that the hollow core of evaporation cover 137 covers and surrounds the top portion of a tube 149 without touching the walls of the tube 149. This provides an evaporation resistant environment without cross contamination of controls or calibrators. To access the contents of tube 149, the robot arm simply removes cover 137, places the cover somewhere else, and picks up tube 149 for automatic transport to a location within the analyzer system where the control or calibrator is needed. When that control or calibrator is no longer needed, the automation system brings that tube back within reach of the robot arm, where the arm can pick and place that tube back into the corresponding slots in tube assembly 117 and replace cover 137 closing the lid to the refrigerated compartment.

An exemplary insulated cold chamber assembly comprises a cold plate of base assembly 118, to which the three TEDs 122 mount (see FIG. 4). The cold plate mounts to a structural plastic housing, which allows the CCS to be mounted to the SH component deck. When the TEC Base is mounted to the cold chamber assembly, controlled refrigerated air is carried through to the 63 tube positions. In some embodiments, the mounting plate is machined to have drip channels leading to two drains, which allow condensate to exit the CCS. The TEDs are controlled by the device control manager (DCM) controller board. This controller board has at least one processor for regulating temperature and overseeing the module. It transmits power from the 24 Volt supply, and provides active control and data collection for the TEDs and associated thermistors. Additionally, it provides power and control to the SH Exhaust Fan.

A drip tray is mounted to the SH frame beneath the subassembly and collects the condensate from the drains in the cold chamber assembly. The TED fans blow warm air over the drip tray. The air flow from the TED fans, in combination with the SH Exhaust fan, will evaporate the condensate from the drip tray. In addition to the three assemblies, the CCS is supported by components of the SH: SH exhaust fan and SH 24 Volt power supply. A series of tapered channels allow gravity to drain condensate from the tube slots. These funnel into the drain tubes, which can be situated between thermoelectric coolers on the bottom of the tube base.

Figure 12:
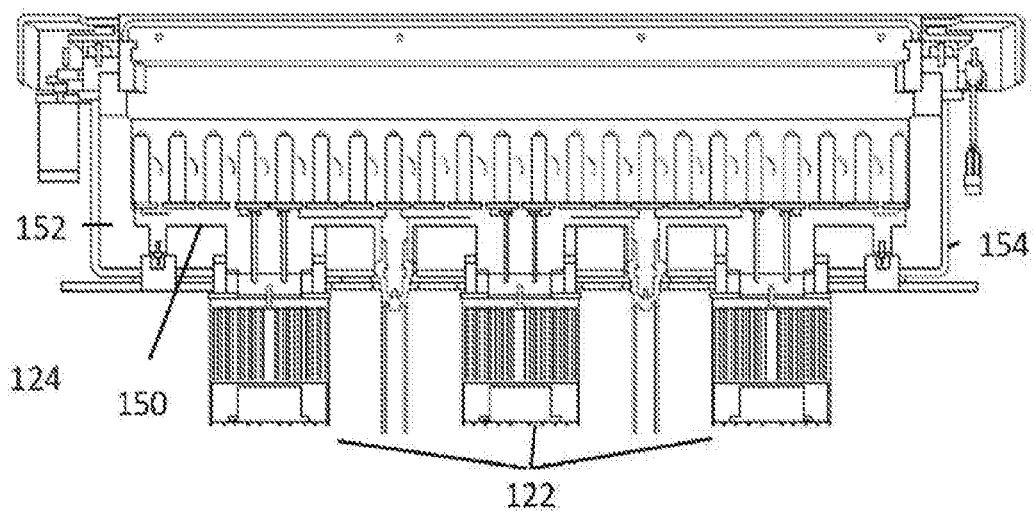
FIG. 12 is a cutaway view of an exemplary refrigerated storage system for use with some embodiments.

FIG. 12 is an exploded view of an exemplary cold chamber assembly that makes up base assembly 118. The innermost surface of base assembly 118 is a liner 150. In some embodiments, this liner can be manufactured from molded or machined stainless steel and acts as a cold plate. This liner generally has a hollow rectilinear shape suitable for surrounding tube assembly 117. Liner 150 can also have hollow protrusions and cutouts for allowing TED and thermistor components to cool the interior volume. To insulate liner 150, an over molded insulating foam layer 152 is formed between liner 150 and outer housing 154. This allows liner 150 to be thermally conductive to provide a cold sink, while being insulated from the surrounding environment to more readily maintain refrigerated temperatures. Insulating layer 152 can be made from over molded polypropylene foam insulation, which is inserted into the housing cover or formed between liner 150 and housing 154. Housing 154 can be any suitable material to provide rigidity and provide mounting points to the sample handler module, such as ABS plastic. Liner 150 can also include a separate larger gauge cold plate thermally coupled to liner 150. This cold plate (which can be metal, such as copper, aluminum, or steel) is mounted directly to the thermoelectric coolers to provide a thermal base for cooling the chamber. Outer housing 154 includes pass-throughs to allow the insertion of TECs 122 which can be thermally mounted to the cold plate or liner 150. Housing 154 also includes openings to allow the mounting of thermistors 124.

Figure 13:
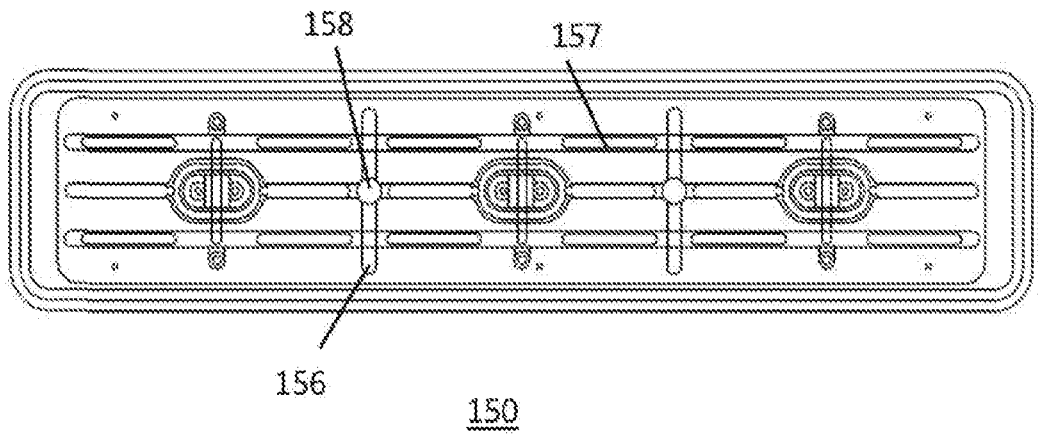
FIG. 13 is a top-down view of an exemplary cold chamber assembly for use with some embodiments.

FIG. 13 is a top-down view of an exemplary cold chamber assembly liner 150 or cold plate mounted to the liner. A series of tapered channels in both horizontal directions 156 and 157 allow drainage to NPT holes 158 to reduce condensation from forming. TECs can be mounted to liner 150 via screws.

Figure 14:
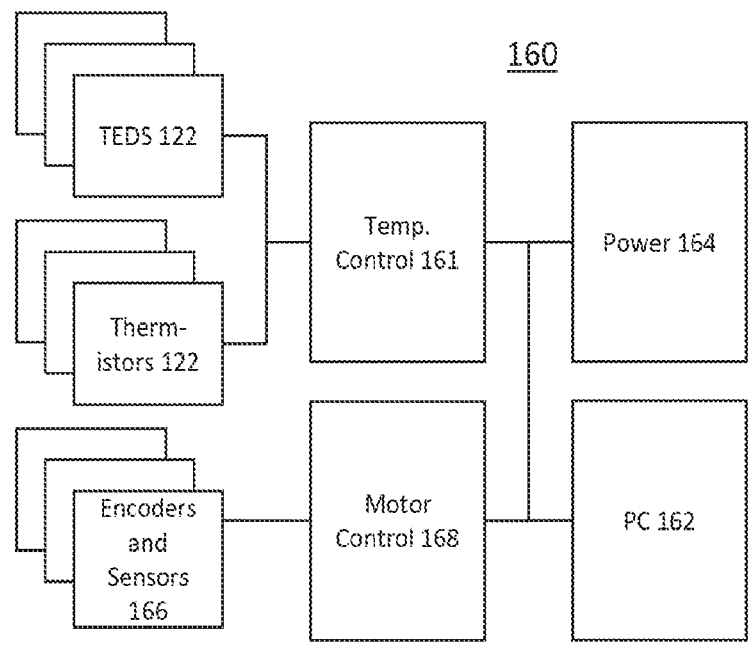
FIG. 14 is an electrical diagram for an exemplary refrigerated storage system for use with some embodiments.

FIG. 14 is an electrical diagram of an exemplary cold chamber system 161. TEDs 122 and fans are controlled by a temperature controller 161, such as a Laird controller. Controller 161 activates TEDs and fans in response to sensor input from thermistors 124. Controller 161 can use any known control algorithm such as PID, proportional control, integration control, threshold control, differential control, or any combination thereof. The setup, configuration, and oversight for temperature controller 161 is provided by PC 162, which allows software to set thresholds, set points, monitor status, etc. Power subsystem 164 provides DC power to the temperature controller (24 V) and to optional motor controller 168, which controls opening and closing of cold chamber doors via motor encoders and sensors 166 (using 48v power). Motor controller 168 is managed by PC 162. Communication between PC 162 and motor controller 168 and temperature controller 161 can include a serial or controller area network (CAN) bus.

Figure 15:
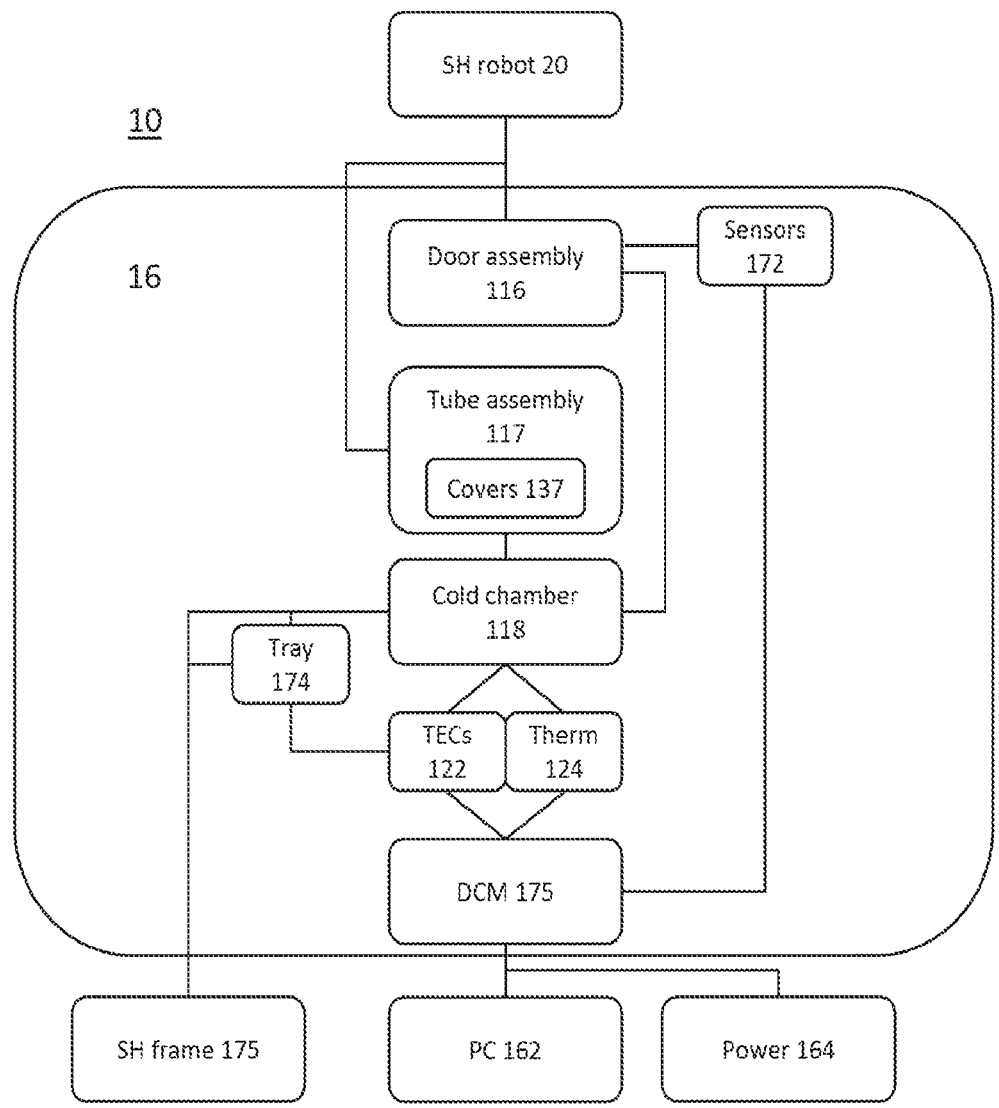
FIG. 15 is a functional diagram for an exemplary refrigerated storage system for use with some embodiments.

FIG. 15 is a functional diagram of another exemplary CCS. As illustrated in the mechanical diagram of FIGS. 1 and 2, sample handler system 10 includes a robot 20 and cold chamber system 16. The mechanical components of CCS 16 includes a tube access door assembly 116, which sits atop tube and evaporation cover base assembly 117, which houses evaporation covers 137. Tube assembly 117 is integrated into the recess of cold chamber assembly 118. Cold chamber assembly 118 houses thermistors 124, which send a resistance signal indicative of the temperature within the cold chamber assembly 118 to thermal control module 161. Device control module 175 activates TEDs 122 to maintain a constant temperature within cold chamber assembly 118, in a manner similar to temperature controller 161 discussed above. Device control module 175 can also monitor the status of doors using the door sensors 172. Condensation drips from cold chamber 118 into drip tray 174, which receives airflow from the fans of TEDs 122. Any remaining condensation drips into the sample handler lower frame 176, to which cold chamber assembly 118 is mounted. Thermal control module 161 operates under the control of PC 162, and receives power from power module 164.

The state of the door is monitored by cam arm sensors and door closed sensors that provide a signal to the device control manager (DCM). Once the door assembly is opened, the robot arm can have access to a cold chamber assembly. The robot arm also interacts with tube and evaporation covers in the tube and evaporation covers base assembly. Robot end effectors are responsible for removing evaporation covers for accessing the tubes underneath. These covers sit atop the cold chamber assembly. Thermistors in the cold chamber assembly provide temperature signals to the DCM. In response to the thermistor signals, the DCM controls TEDs and fans to regulate temperature. Beneath the cold chamber assembly and above the TEDs, condensation channels feed into a drip tray, which drains into the SH lower frame. Power is supplied to the DCM via 24 V interconnects. Signals to the DCM from other processors and controls in the system are provided by a CAN bus.

In some embodiments, the home state of doors is closed. In the event of an electrical failure, the door should be returned to its normal position.

In some embodiments, the DCM reports a log of temperatures received from the thermistors to another controller. This can be used for event logging purposes in troubleshooting.

Figure 16:
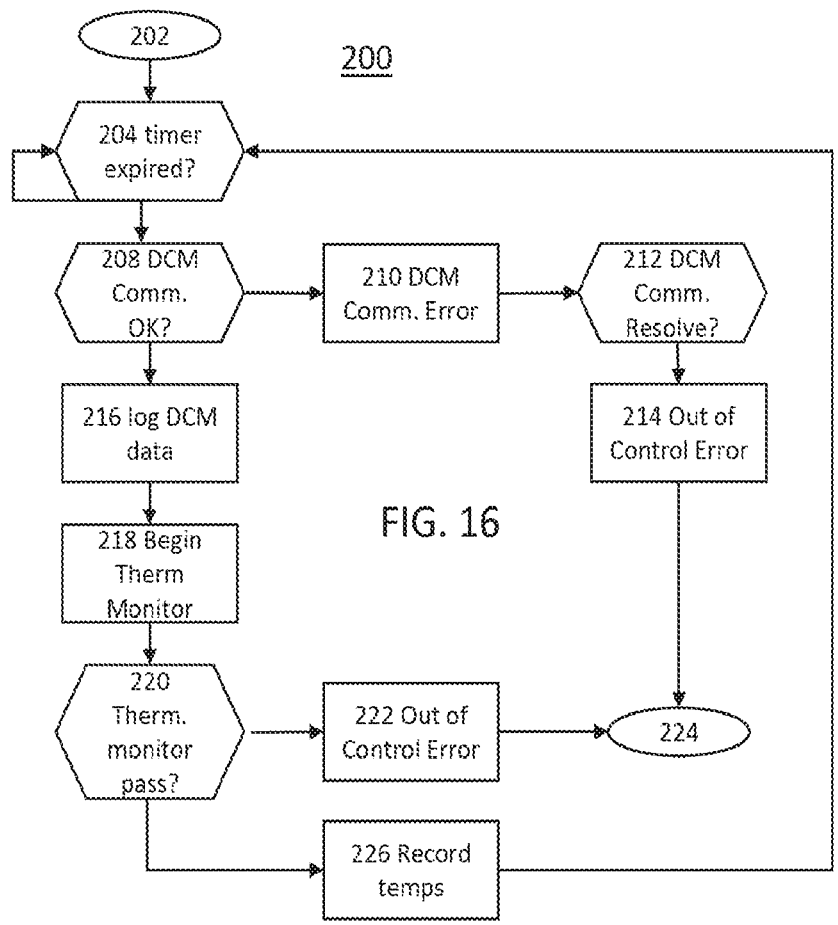
FIG. 16 is a flow chart of an exemplary method for operating the refrigerated storage system in accordance with some embodiments.

FIG. 16 is a flow chart of an exemplary CCS monitoring operation 200. At step 202, the process starts and initiates a loop timer. This loop timer is responsible for the control loop to maintain temperature within the CCS. At step 204, the processor determines whether the loop timer has expired. Once the time has expired, operation proceeds to step 206, where the sample handler software retrieves the DCM data, including all thermistor temperatures, fan speeds, TED currents, TED duty cycle, etc. via the CAN bus. This allows software to maintain a status model of the operating state of CCS. At step 208, software determines if DCM communications was successful. If not, a DCM loss of communications error routine 210 is initiated. At step 212, it is determined whether or not communications problems have been resolved, which allows the loop to proceed. If not, at step 214, a CCS out of control error routine is initiated, which can alert the operator or other computers on the network that there is an error with the CCS module but cannot be resolved.

At step 216, SH software logs all DCM data to a SH trace log. At step 218, a thermistor monitor routine is initiated that oversees a checklist of status conditions for each thermistor in the CCS. Exemplary items overseen by the thermistor monitor routine include verifying that no thermistors a failed, verifying that all TED fan speeds are below 50% duty cycle, verifying that an event log is being maintained, verifying that the temperature readings after a startup interval are with an expected range for the CCS, verifying that during a startup phase, thermistor readings are going down at an expected rate, and verifying that thermistor readings are within expected tolerances. If thermistor monitor routine 220 determines that any error or unexpected value has occurred, CCS out of control error routine 222 can be initiated. As a result of CCS out of control error modules 222 or 214, monitoring operation 200 will terminate at step 224 to allow an operator to investigate and repair any problems that may have caused the error states. If no error is encountered, operation proceeds to step 226 where the current temperature values of thermistors are recorded, the ready to run state is noted, and the loop timer is reset. Operation then proceeds to step 204.

A loop timer of configurable duration can be used to control the frequency of the monitoring operation. Each time the timer expires, SH software retrieves DCM data, including all thermistor temperatures, fan speeds, TED currents, TED duty cycles, etc. from the CAN bus. If unsuccessful, this triggers a DCM loss of communication state. Once the communications are restored, operation can begin again. If communications cannot be returned, an error flag can be triggered and the loop can end. If communications are successful, software logs DCM data, creating a thermistor monitor data log. If thermistors fail, an error state can be created and monitoring can be stopped. If TED fan speeds are out of compliance, this error state can be triggered. A separate logging interval can be used, whereby the log is only created after a time interval that is greater than some preset log interval. If the log has not been updated recently, an average of thermistors can be created and entered into the event log. If a service has been done within the last update time interval, thermistor temperatures can be logged. If the temperature differential between the thermistors is greater than 1° C., error state can be created and monitoring ended. If the CCS is in the startup state, thermistors can be checked to verify they are in a ready to run temperature range. If not in the startup mode, thermistors can be checked to verify that they are operating in a normal temperature range. If not, an error state can be created and monitoring stopped. If thermistors are not ready to run in the startup mode, they can be given time to complete a startup mode. However, a special time for the startup mode can be treated and, if thermistors are not ready to run within that threshold time, an error state can be created. Once thermistors are in a ready to run state, a central controller can be notified of the change in status thermistors. The loop then repeats.

The operation of the CCS can also be described with reference to the following states. Starting from an off state, power is turned on, allowing the DCM to listen. This results in a startup phase. Once initialization is complete, the system is warming up. If maintenance is needed, a maintenance state can be started. If not, the system can be ready. Processing is stopped, and a standby state is entered. In some embodiments, an eco-mode is used during standby. Once the system is warmed up, and there is a request to start diagnostics, a diagnostics mode can be entered. During diagnostics, shutdown can be requested. When the system is ready, once samples are loaded and work orders are received, the processing state can be entered. Errors can result in pausing or stopping.

The following are exemplary states:

Off: While in the 'Off' state, the module has no power.

Listening: In the 'Listening' state, the module has power. The module is in a mode where it is waiting to hear instructions from the central computer. No tests or samples can be processed in this state.

Startup: During the 'Start Up' state, the central computer is initializing communication with each module in the system. The individual modules are coming online by initializing motors, homing subassemblies, and establishing temperature control.

Warming Up: In this state, module initialization is complete. The module is waiting for all temperature and humidity controlled areas to reach their acceptable level. The system/module shall be able to transition to 'Ready' in <=90 minutes from entering this state.

Ready: While in the 'Ready' state, the module is not processing any tests, but is ready to accept samples and work orders. The transition from 'Ready' to 'Processing' shall be completed in <=two minutes.

Processing: In this state, the system/module is actively processing samples and tests. There are no known barriers for the system to generate results.

Standby: While in the 'Standby' state, the module is not processing any samples or tests, but is ready to accept samples and work orders. The transition to 'Ready' can take longer than two minutes, and shall go back through 'Startup.'

Eco-Mode: Eco-Mode is a special mode where the system will go to conserve energy and/or resources. The target savings for Eco-Mode is a 10% to 20% reduction in energy/resources consumed compared to the 'Standby' state. Possible behaviors include, but are not limited to: eliminate all current to motors; stop performing priming of system components; turn off vacuum pumps; turn off heaters/coolers; and turn off monitor(s) or wireless components. The actual behavior will be determined by each module to accomplish the targeted energy or resource savings.

Pausing: In this state, the module will not process new samples or tests. Any tests or samples that are already in progress will continue to process to their final result.

Stopping: While in this state, the module is bringing most internal activities to a complete stop. No new samples or tests will be processed. All samples or tests currently in progress are stopped prior to getting the final result.

Stopped: The module has stopped processing samples or tests, and is unable to resume processing without human intervention.

Maintenance: While in the 'Maintenance' state, the module is performing user requested or scheduled, automated maintenance, or self-diagnostic routines. The module will not process samples or tests while in this state. Some examples of 'maintenance' activities include, but are not limited to: backup of database(s); perform probe cleaning; perform water test; and run daily checks.

Diagnostics: The 'Diagnostics' state is a specialized state that is used for troubleshooting purposes on the system/module. While in this state, the module is under control of the diagnostics or exerciser software program. No tests or samples can be processed by the module while in this state.

Shutting Down: In this state, the software programs for running tests and diagnostics are being closed, and information is being saved.

Alignment of the robot arm relative to the CCS can be accomplished via an alignment procedure conducted at installation and during regular maintenance intervals. During an alignment procedure, the SH Robot will determine the position of one or more reference tube slots in the CCS. From those positions, all remaining CCS positions will be calculated. A stylus tool is placed in the robot gripper. The robot moves to where it expects to find the top surface of the TEC base. It presses down until the crush sensor engages. After factoring a 15 mm offset for the crush sensor, CCS Top position is known. From this position, height to pick up tubes, height to pick up evaporation covers, and tube bottom are calculated. The robot then moves the stylus to a first tube slot and overdrives into the 4 cardinal points two times each. Using the eight data points, it determines the center of the tube. This process is repeated at another tube slot. Using the angle between the two points and the offsets between rows and columns, the remaining positions are calculated.

Exemplary embodiments of the CCS are designed to be field serviceable, allowing a customer service engineer to replace various components. For example, a field technician should be able to replace a TED, thermistor, DCM, tube spring, door assembly, etc.

In some embodiments, software can disable any position within the CCS for tube usage should any error occur, or by requests of an operator. Software coupled to the DCM maintains an inventory of all controls and calibrators and their location within the tube array of the DCM. Additionally, status information for each control or calibrator can be maintained, including the amount of time the tube has been resident in storage and the number of times it has been accessed. After a certain time or a number of uses, the DCM can request that the tube be refreshed with a new control or calibrator, alerting the operator to load new controls or calibrators via the loading drawers at the operator's convenience.

The following are some additional features that may be used with certain embodiments of the CCS. A hard coat anodized surface finish may be applied to the cold plate chamber to assist in removal of condensate from the walls. Tapered channels at the bottom may improve liquid flow. Mold safe tubing may be used to mitigate mold growth. The CCS can be located within 61 cm of the front of the sample handling module for ease of access during servicing. The tube slots within the CCS can utilize a retention leaf-spring to apply pressure to a control or calibrator tube pressing it into an opposable V-shaped wall to assist in aligning it for easy access by the sample handling robot. Cable clips can be used to prevent thermistor cables from being caught on moving parts. In the event of a failure of CCS, software can maintain a timer to record and log the length of time during which refrigeration did not occur. Any thermal sensor information obtainable during this period can be added to this log to assist in verifying the integrity of controls and calibrators. The health of TED fans can be checked periodically by the sample module manager (SMM) software. Repeated measurements and speed below a specified threshold will be treated as fan failure, resulting in TEDs being disabled and the operator and software being notified. Exemplary CCS systems are capable of cooling to 32F from ambient temperature within 30 minutes.

Figure 17:
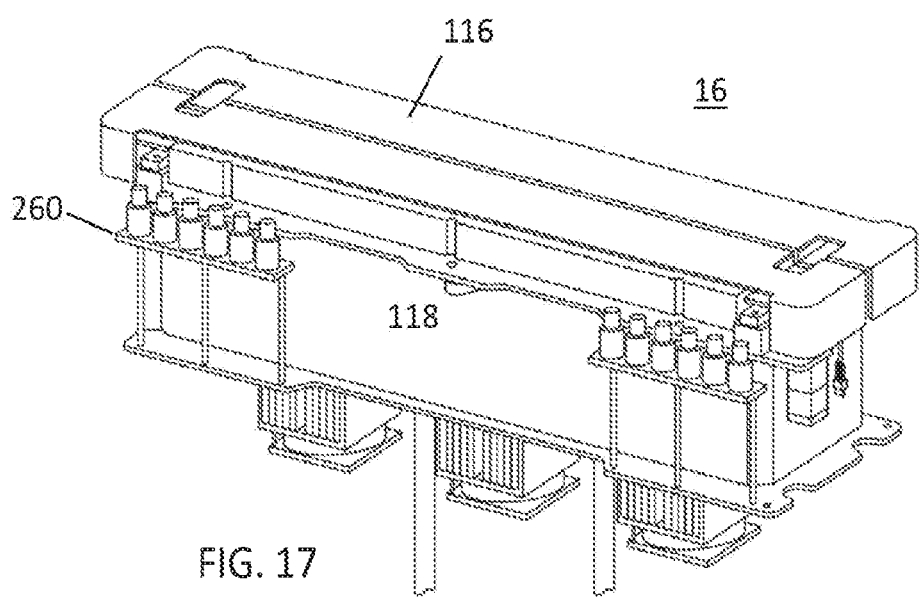
FIG. 17 is a perspective view of an exemplary refrigerated storage system for use with some embodiments.

FIG. 17 is a perspective view of an embodiment of a CCS having shelves for temporary storage of evaporation covers. Shelves 260 are rigidly affixed to housing 118, and provide a place for the robot arm to place evaporation covers when not in use or when taking a fluid tube out of the CCS module. Generally, shelves 260 are placed such that they are accessible when the sliding doors are open. In some embodiments, shelves 260 are accessible to an operator, such that maintenance on the CCS can be performed, and the shells provide a place for an operator to place and orient the evaporation covers when the sample handling module initializes after maintenance.

Figure 18:
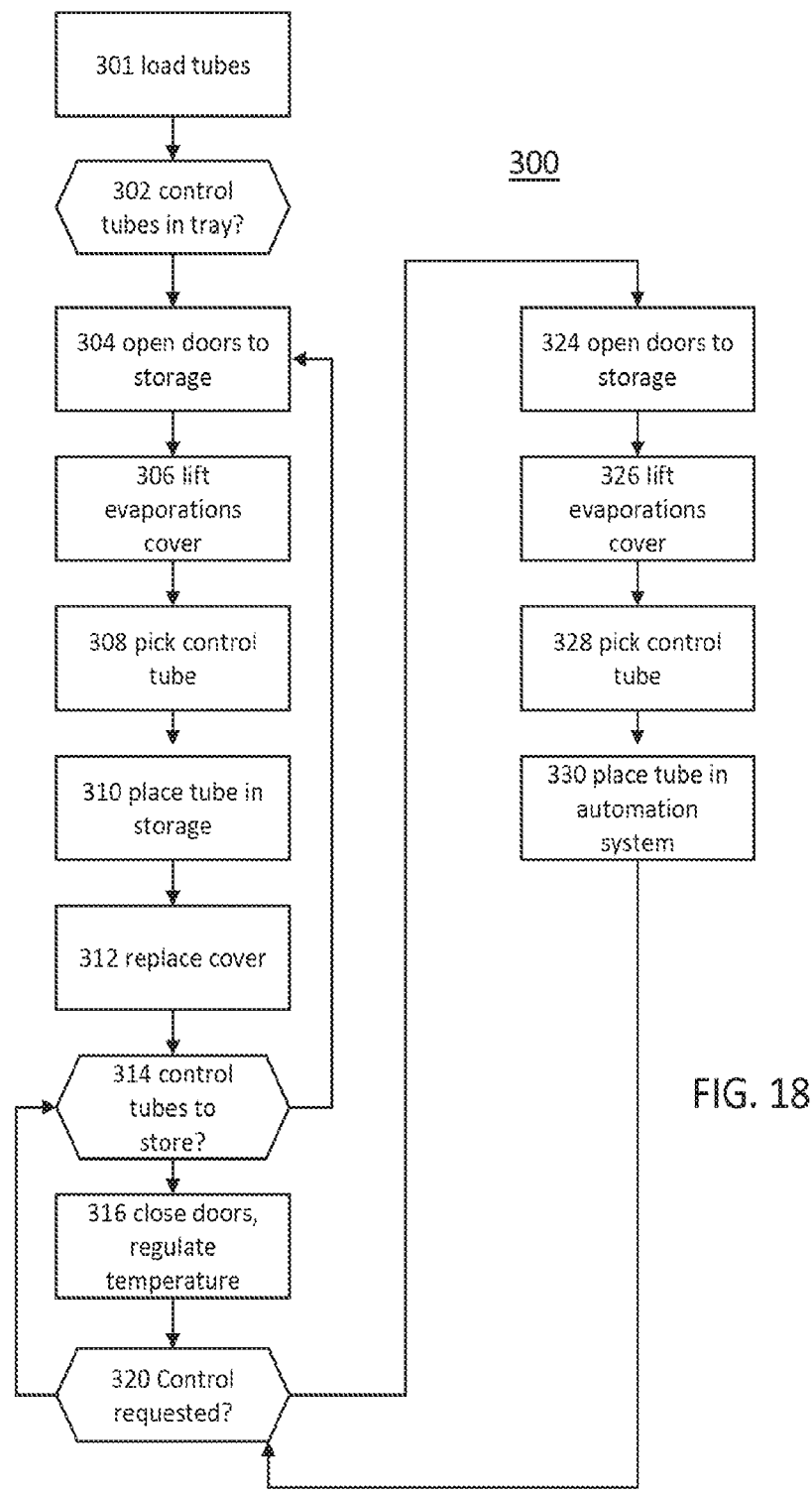
FIG. 18 is a flow chart of an exemplary method for operating the sample handling module in accordance with some embodiments.

FIG. 18 is a flow chart of an exemplary method 300 for operating the sample handling module with respect to the refrigerated storage. At step 301, an operator loads trays of sample tubes and controls or calibrators into the sample handling module. At step 302, a processor of the sample handling module determines based on identifier information of the tray or the tubes whether or not the loaded tray includes any controls or calibrators. If so, those controls and calibrators will need to be stored. At step 304, the sample handling module opens the doors to the refrigerated storage. This can be via any method described herein. At step 306, the sample handler robot arm picks and lifts in the evaporation covers necessary to provide the storage slot for each control or calibrator tube from the loaded tray. Once the evaporation cover is removed, at step 308, the robot arm picks the control or calibrator tube from the tray. At step 310, the robot arm then places that tube in the empty slot in the refrigerated storage. At step 312, the robot arm replaces the cover, providing an evaporation resistant environment for that control or calibrator. At step 314, the sample handler processor determines whether or not additional tubes require storage in refrigerated storage. In some embodiments, the doors are immediately closed upon replacement of the cover step 312. The additional tubes require storage, method 300 returns to step 304. If no additional tubes need to be placed in refrigerated storage, at step 316, the doors of the refrigerated storage are closed in the direction of the sample handler processor. Then, the DCM maintains a regulated storage temperature, with each tube in the refrigerated environment and covered by an evaporation cover.

At step 320, a processor of the sample handler determines whether or not the clinical analyzer served by the sample handler requires a stored control or calibrator. If so, at step 324, the doors to refrigerated storage are opened. Then, the robot arm lifts the evaporation cover that covers the responsive to control or calibrator at step 326, and then picks that control tube at step 328, and places that tube into the automation system, such as by placing that tube into a carrier on an automation track 14 at step 330. The method then returns to step 320, where it is determined whether or not additional tubes need to be removed from refrigerated storage. If there are no control or calibrator tubes being requested, method 300 returns to step 314 where it is determined whether or not additional tubes need to be stored. For example, once a control or calibrator is used by the clinical analyzer and a carrier returns to the automation track, that tube will generally be placed back into the refrigerated storage in the same manner in which tubes were placed from loaded trays, starting at step 304. In the interim, when there are no requested tubes and no pending tubes to be placed into storage, method 300 maintains the loop of steps 314 through 320, where temperature is being regulated, and doors are prepared to be opened to the refrigerated storage should a tube you need to be stored or removed. These determination steps occur via a processor automatically. Requests come from other processors or software routines within the clinical analyzer to ensure that the controls and calibrators are delivered when and where needed by the automation system and otherwise stored in refrigerated storage to enhance shelf life.

Although the present invention has been described with reference to exemplary embodiments, it is not limited thereto. Those skilled in the art will appreciate that numerous changes and modifications may be made to the preferred embodiments of the invention and that such changes and modifications may be made without departing from the true spirit of the invention. It is therefore intended that the appended claims be construed to cover all such equivalent variations as fall within the true spirit and scope of the invention.

What is claimed is:

1. A refrigerated storage assembly for integration into a clinical analyzer comprising:
    an insulated housing;
    an insulated door assembly comprising one or more doors;
    one or more thermoelectric coolers; and
    a refrigerated base assembly contained within the insulated housing and beneath the insulated door assembly, wherein the refrigerated base assembly comprises:
        an interior thermal sink thermally coupled to the one or more thermoelectric coolers,
        one or more thermal sensors,
        a plurality of receptacles arranged in an array, each receptacle configured to receive one of a plurality of fluid tubes, and
        a plurality of removable evaporation covers, configured to rest on the refrigerated base assembly without contacting the plurality of fluid tubes and configured to be moved by a sample handling robot arm,
    wherein when the one or more doors are closed, the refrigerated base assembly provides a refrigerated environment configured for multi-day storage of at least one of a control and a calibrator fluid contained within the plurality of fluid tubes.

2. The refrigerated storage assembly of claim 1, wherein the insulated door assembly comprises a first and a second door that opens and closes in a sliding manner.

3. The refrigerated storage assembly of claim 2, wherein each of the first and second doors is controlled by a motor and a rack and pinion gear mechanism.

4. The refrigerated storage assembly of claim 2, wherein the door assembly is configured to be opened when the robot arm moves the first door, the second door being coupled to the first door via a rack and pinion gear mechanism.

5. The refrigerated storage assembly of claim 1, wherein the one or more thermoelectric coolers comprises three thermoelectric coolers, each cooler comprising a Peltier cooling device, a fan, and a heatsink.

6. The refrigerated storage assembly of claim 1, wherein the plurality of evaporation covers comprise an external shape having a top portion having a diameter substantially similar to a diameter of each of the fluid tubes and a base portion having a diameter large enough to surround a top portion of each fluid tube.

7. The refrigerated storage assembly of claim 1, wherein the plurality of evaporation covers comprise a polymer material and one or more magnets that magnetically couple to the refrigerated base assembly.

8. The refrigerated storage assembly of claim 6, wherein the plurality of evaporation covers are configured such that each evaporation cover does not touch each of the plurality of fluid tubes when placed onto the refrigerated base assembly.

9. The refrigerated storage assembly of claim 1, further comprising a plurality of channels and at least one drain, wherein the plurality of channels and the at least one drain are configured to remove condensation from within the insulated housing.

10. The refrigerated storage assembly of claim 1, wherein the plurality of receptacles each comprise a V-shaped wall and a spring that pushes each of the fluid tubes into the V-shaped wall.

11. A sample handler module for use in an in vitro diagnostics (IVD) analysis system comprising:
- a robot arm;
- a plurality of input drawers configured to receive trays of sample fluids; and
- a refrigerated storage assembly configured to store at least one of a control and calibrator fluid for multi-day storage, wherein the refrigerated storage assembly comprises:
  - an insulated housing,
  - an insulated door assembly comprising one or more doors,
  - one or more thermoelectric coolers, and
  - a refrigerated base assembly contained within the insulated housing and beneath the insulated door assembly, wherein the refrigerated base assembly comprises:
    - a metal plate thermally coupled to the one or more thermoelectric coolers,
    - one or more thermal sensors, and
    - a plurality of receptacles arranged in an array, each receptacle configured to receive one of a plurality of fluid tubes.

12. The sample handler module of claim 11, wherein the insulated door assembly comprises a first and a second door that open and close in a sliding manner.

13. The sample handler module of claim 12, wherein each of the first and second doors is controlled by a motor and a rack and pinion gear mechanism.

14. The sample handler module of claim 12, wherein the door assembly is configured to be opened when the robot arm moves the first door, the second door being coupled to the first door via a rack and pinion gear mechanism.

15. The sample handler module of claim 11, wherein the one or more thermoelectric coolers comprises three thermoelectric coolers, each cooler comprising a Peltier cooling device, a fan, and a heatsink.

16. The sample handler module of claim 11, further comprising a plurality of evaporation covers that are configured to be placed over each of the plurality of fluid tubes.

17. The sample handler module of claim 16, wherein the plurality of evaporation covers comprise one or more magnets that magnetically couple to the refrigerated base assembly.

18. The sample handler module of claim 16, wherein the plurality of evaporation covers are configured such that each evaporation cover does not touch each of the plurality of fluid tubes when placed onto the refrigerated base assembly.

19. The sample handler module of claim 11, wherein the insulated housing comprises a bottom surface having a plurality of channels and at least one drain, wherein the plurality of channels and the at least one drain are configured to remove condensation from within the insulated housing.

20. The sample handler module of claim 11, wherein the plurality of receptacles each comprise a V-shaped wall and a spring that pushes each of the fluid tubes into the V-shaped wall.

21. A method for automated storage of at least one of a control and calibrator fluid, comprising steps of:
- opening, using at least one of a sample handling robot arm and a motor, an insulated door assembly to a refrigerated chamber;
- lifting at least one of a plurality of evaporation covers contained within the refrigerated chamber using the sample handling robot arm;
- placing at least one of a plurality of fluid tubes containing at least one of a control and a calibrator fluid into one of a plurality of receptacles in the refrigerated chamber using a robot arm;
- replacing the at least one of a plurality of evaporation covers over the at least one of a plurality of fluid tubes using a robot arm;
- closing the insulated door assembly to the refrigerated chamber; and
- regulating, via a processor, temperature of the refrigerated chamber using at least one thermoelectric device.

* * * * *